United States Patent [19]

Dvornic et al.

[11] Patent Number: 5,739,218
[45] Date of Patent: Apr. 14, 1998

[54] RADIALLY LAYERED COPOLY (AMIDOAMINE-ORGANOSILICON) DENDRIMERS

[75] Inventors: Petar R. Dvornic; Agnes M. deLeuze-Jallouli; Douglas Swanson; Michael James Owen, all of Midland; Susan Victoria Perz, Essexville, all of Mich.

[73] Assignees: Dow Corning Corporation; Michigan Molecular Institute, both of Midland, Mich.

[21] Appl. No.: 867,143

[22] Filed: Jun. 2, 1997

[51] Int. Cl.⁶ .................................................. C07F 283/00
[52] U.S. Cl. .................... 525/487; 521/134; 521/184; 525/417; 525/474
[58] Field of Search .................... 525/487, 474, 525/417; 521/134, 184

[56] References Cited

U.S. PATENT DOCUMENTS

| | | | |
|---|---|---|---|
| 5,387,617 | 2/1995 | Hedstrand | 521/79 |
| 5,393,795 | 2/1995 | Hedstrand | 521/134 |
| 5,393,797 | 2/1995 | Hedstrand | 521/134 |
| 5,560,929 | 10/1996 | Hedstrand | 424/486 |

OTHER PUBLICATIONS

I. Gitsov, K. Wooley, C. J. Hawker, P. T. Ivanova and J. M. Frechet, Macromolecules, 26, 5621 (1993).

T. M. Chapman, G. Hillyer, E. J. Mahan and K. A. Shaffer, J. Amer.Chem.Soc., 116, 11195 (1994).

T. M. Chapman and E. J. Mahan, Polymer Preprints, 73, 275 (1995).

E. J. Mahan and T. M. Chapman, Polymer Preprints, 37(2), 247 (1996).

K. Lorenz, R. Mulhaupt, H. Frey, U. Rapp and F. J. Mayer–Posner, Macromolecules, 28, 6657 (1995).

A. W. Adamson, Physical Chemistry of Surfaces, 4th Ed., John Wiley & Sons, New York, 1982, p. 70.

W. Noll, H. Steinbach and C. Sucker, Prog. Colloid Polym. Sci., Hi, 131 (1971).

D. A. Tomalia, "Dendritic Molecules", Sci. Amer., 272, 62–66, 1995.

P.R. Dvornic and D.A. Tomalia, "Molecules that Grow Like Trees. Dendritic Polymers: The Fourth Major Class of Macromolecular Architecture", Science Spectra, 5, 36, (1996).

P.R. Dvornic and D.A. Tomalia, "Dendritic Polymers. Divergent Synthesis (Starburst (R) Polyamidamine Dendrimers)", in The Polymeric Materials Encyclopedia, J.C. Salamone, E.D., CRC Press Inc., Boca Raton, vol. 3, pp. 1814–1830, 1996.

P.R. Dvornic and D.A. Tomalia, "Recent Advances in Dendritic Polymers", Current Opinion in Colloid and Interface Science, 1(2), 221, (1996).

P.R. Dvornic, "Some Recent Advances in the Silicon Containing Polymers", Materials Science Forum, vol. 214, pp. 131–138, (1996).

Primary Examiner—Morton Foelak
Attorney, Agent, or Firm—James L. Decesare

[57] ABSTRACT

Radially layered copoly-dendrimers having unusual surface properties and novel applications have been synthesized and characterized. These are the first copolymeric dendrimers composed of a hydrophilic poly(amidoamine) (PAMAM) interior with hydrophobic organosilicon surfaces. These dendrimers have been prepared by surface modifications of an ethylene diamine core PAMAM dendrimer with (3-acryloxypropyl)methyldimethoxysilane, (3-acryloxypropyl)bis(vinyldimethylsiloxy)methylsilane, (3-acryloxypropyl)tris(trimethylsiloxy)silane, chloromethyltrimethylsilane, and chloromethyldimethylvinylsilane, to varying degrees of surface coverage. The obtained products were characterized by $^1$H, $^{13}$C, and $^{29}$Si NMR, and by DSC and TGA. The dendrimers with less completely covered organosilicon surfaces are water soluble, and have considerable surface activity, the best of which lowered the surface tension of water to less than 30 mN/m. Areas in their surface, according to the Gibbs adsorption isotherm, are surprisingly small, i.e., of the order of 100 Å²/mol. More completely hydrophobed dendrimers are water insoluble, and form spread monolayers on water, capable of sustaining surface pressures over 40 mN/m. Areas per molecule are in the 1,000 Å²/mol range.

13 Claims, No Drawings

RADIALLY LAYERED COPOLY (AMIDOAMINE-ORGANOSILICON) DENDRIMERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to (i) organosilicon surface modifications of ammonia, ethylene diamine, cystamine, or other amine, diamine, or triamine, core poly(amidoamine) (PAMAM) dendrimers; (ii) organosilicon surface modifications of ammonia, ethylene diamine, cystamine, or other amine, diamine, or triamine, poly(propyleneimine) (PPI) dendrimers; and (iii) organosilicon surface modifications of other amino surface dendrimers.

Dendrimers represent a subclass of dendritic polymers which are the fourth and the most recently discovered type of macromolecular architecture; as noted, for example, in *Science Spectra*, Volume 5, Page 36, (1996). Dendrimers are more complex, but at the same time more regular, i.e., ordered, than any other of the classical architectures known such as linear, randomly branched and/or crosslinked structures. Ideally, they contain one branch juncture per each repeating unit, and are built of mathematically precise covalent arrays of branches upon branches, which surround in concentric layers referred to as generations, a central atom or atomic group called a core. Reference may be had, for example, to *The Polymeric Materials Encyclopedia*, Volume 3, Pages 1814–1830, CRC Press Inc., Boca Raton, (1996).

Because synthetic procedures developed for dendrimer preparation permit unusually high degrees of reaction control, these polymers can be obtained with a very high degree of structural regularity, not common to any other class of synthetic macromolecule. As a consequence, dendrimers show very unusual structural properties with respect to the classical polymers of comparable molecular weight. Among others, these properties, as noted in *The Polymeric Materials Encyclopedia*, Volume 3, include:

(1) almost perfect isomolecularity even at relatively high generations, i.e., $\overline{M}_w/\overline{M}_n$ values as low as 1.0005;

(2) very well defined molecular sizes which increase in regular increments of the order of 8–10 Å per generation spanning the lower nanoscopic range from about 1 to about 10 nm;

(3) regular, oval molecular shapes which at higher generations tend to become highly symmetrical and approximately spherical; and (4) unusually high functionality, particularly at higher generations, which results from a large number of exo-oriented surface groups per dendrimer molecule.

Because of these unique structural characteristics, dendrimers clearly offer exciting possibilities for applications that are not accessible using traditional classes of macromolecular compounds and architecture. See, for example, *Current Opinion in Colloid and Interface Science*, Volume 1(2), Page 221, (1996).

As the name implies, dendrimers are tree-like, three dimensional polymers which can be thought of as possessing a core, an interior, and an exterior surface. The original, well-defined dendrimer family are PAMAM dendrimers, described by Donald A. Tomalia in an article entitled "Dendritic Molecules", *Scientific American*, Volume 272, Page 62–66, May 1995.

While organosilicon dendrimers are not new, the concept of copoly-dendrimers containing organosilicon species is less common. For example, surface-modified carbosilane dendrimers have been described by Klaus Lorenz, Rolf Mulhaupt, and Holger Frey, in an article entitled "Carbosilane-Based Dendritic Polyols", Macromolecules, Volume 28, Page 6657–6661, 1995. These authors suggest uses of the materials as host-guest systems, in ordering of solutions and emulsions, and as potential nanoreactors. However, the Lorenz et al disclosure is actually an inversion of our invention, since it relates to dendrimers having a hydrophobic interior and a hydrophilic exterior, whereas our invention is directed to the reverse.

BRIEF SUMMARY OF THE INVENTION

This invention relates to poly(amidoamine) (PAMAM) dendrimers, or other hydrophilic dendrimers, whose surface has been partially or completely derivatized with inert or functional organosilicon moieties. These dendrimers are referred to herein as radially layered copoly(amidoamine-organosilicon) (PAMAMOS) dendrimers, or as radially layered copoly(propyleneimine-organosilicon) (PPIOS) dendrimers. This is the first organosiliconization of a hydrophilic PAMAM to convert it to a lyophilic organosilicon surface dendrimer.

These dendrimers contain lyophilic (i.e., oleophilic, hydrophobic) surfaces, and hydrophilic interiors. Organosilicon acrylesters and haloalkylsilanes have been shown to be effective derivatizing agents.

When the organosilicon portion is $(CH_3)_3Si-$ based, an inert surface results. When the organosilicon portion is $(CH_3)_2(CH_2=CH)Si-$ based, for example, a vinyl functional surface is obtained. The inert, or nonfunctional materials can be used as novel components of low surface energy coatings for protection, water and oil repellency, release, and antifoaming. They also afford exceptional vapor and flavor transmission barrier properties. The materials with extensive reactive functionality on their surfaces can be used as adhesion promoters and primers. Materials whose surfaces are not completely derivatized can retain the water solubility of PAMAM, and are effective surfactants with potential for a variety of wetting, spreading, and solubilization applications.

These robust, covalently bonded, inverted, polymeric micelles of controlled architecture offer a novel way of delivering active species in areas such as catalysis, drug delivery, gene therapy, personal care, and agricultural adjuvant products.

These and other features of our invention will become apparent from a consideration of the detailed description.

BRIEF DESCRIPTION OF THE SEVERAL VIEWS OF THE DRAWING

Not applicable.

DETAILED DESCRIPTION OF THE INVENTION

According to our invention, the synthesis of dendrimers with radially heterogeneous molecular compositions is based on different combinations of hydrophilic and hydrophobic layers. Thus, the structural units combined in these dendrimers are (a) a water soluble amidoamine repeat structure such as —[(CH$_2$)$_2$—CO—NH—(CH$_2$)$_2$—N]= or a water soluble poly(propyleneimine) repeat structure such as —[(CH$_2$)$_3$N]=, and (b) a hydrophobic organosilicon structure.

The compositions are organized as a hydrophilic poly (amidoamine) (PAMAM) or poly(propyleneimine) (PPI) interior with a hydrophobic organosilicon exterior layer. The nature of the organosilicon layer can be varied, as well as the architectural parameters of the dendrimer structure itself, including the functionality of the core, length and functionality of the branches, and the generation of each different layer, i.e., their relative thickness.

The general structure of such dendrimers and their formation can be represented as shown below:

O 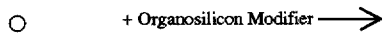 + Organosilicon Modifier ⟶

Hydrophilic Dendrimer
PAMAM/PPI

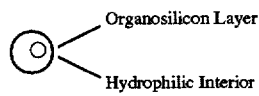 Organosilicon Layer
Hydrophilic Interior

PAMAMOS/PPIOS

Thus, PAMAM and PPI dendrimers, according to our invention, can have their —NH$_2$ surface modified by silanes or siloxanes of the respective formulae

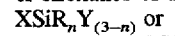 XSiR$_n$Y$_{(3-n)}$ or
 XR"$_p$Y$_{2-p}$Si(OSiR"$_2$)$_m$OSiR"$_n$Y$_{3-n}$ wherein m represents zero to 100; n represents zero, one, two, or three; and p represents zero, one, or two. X can be any group that reacts with —NH$_2$ such as CH$_2$=CHCOO (CH$_2$)$_3$—, ClCH$_2$—, BrCH$_2$— or ICH$_2$—. Other groups that react with —NH$_2$ can also be employed, such as epoxy, ClCO(CH$_2$)$_a$—, R"'OCO(CH$_2$)$_a$—, NCO—R""—, or NCOCH$_2$CH=CH—, wherein a in these other groups represents an integer having a value of 1–6. R, R', R", R"', and R"" are preferably alkyl radicals containing 1–6 carbon atoms, most preferably methyl, an aryl radical such as phenyl, or a fluoroalkyl radical such as —(CH$_2$)$_2$CF$_3$ or —(CH$_2$)$_2$(CF$_2$)$_3$CF$_3$. Y represents a group that does not react with —NH$_2$ such as the vinyl group CH$_2$=CH—, the allyl group CH$_2$=CH—CH$_2$—, —OR, hydrogen, a triorganosiloxy radical, or a ferrocenyl radical.

Representative examples of such organosilicon compounds that can be used herein, are (3-acryloxypropyl)methyldimethoxysilane, (3-acryloxypropyl)bis(vinyldimethylsiloxy)methylsilane, (3-acryloxypropyl)tris(trimethylsiloxy)silane, iodomethyltrimethylsilane, chloromethyltrimethylsilane, and chloromethyldimethylvinylsilane.

PAMAMOS dendrimers, in particular, were prepared by the surface modification of an ethylene diamine core polyamidoamine dendrimer using various acryloxypropyl, chloromethyl, or iodomethyl functional silanes to different degrees of surface coverage. The generation three (E3) ethylene diamine core (EDA) poly(amidoamine) dendrimer is hereinafter referred to as E3 EDA core PAMAM dendrimer in the various examples, or it has been represented in part as an E3 inscribed in a circle in the schematic representation of the process below.

As the surface coverage increased, these materials became water insoluble. PAMAM was chosen as the hydrophilic interior for the reason that it is an original, well-defined dendrimer family, and readily available. The molecular characteristics of PAMAM dendrimers are shown below:

AMMONIA CORE PAMAM DENDRIMER MOLECULAR CHARACTERISTICS

| Generation | Surface Groups (Z) | Molecular Formula | MW | Diameter, Å |
|---|---|---|---|---|
| 0 | 3 | C$_{15}$H$_{33}$N$_7$O$_3$ | 359 | 10.8 |
| 1 | 6 | C$_{45}$H$_{93}$N$_{19}$O$_9$ | 1,044 | 15.8 |
| 2 | 12 | C$_{105}$H$_{213}$N$_{43}$O$_{21}$ | 2,414 | 22 |
| 3 | 24 | C$_{225}$H$_{453}$N$_{91}$O$_{45}$ | 5,154 | 31 |
| 4 | 48 | C$_{465}$H$_{933}$N$_{187}$O$_{93}$ | 10,633 | 40 |
| 5 | 96 | C$_{945}$H$_{1893}$N$_{379}$O$_{189}$ | 21,591 | 53 |
| 6 | 192 | C$_{1905}$H$_{3813}$N$_{763}$O$_{381}$ | 43,507 | 67 |
| 7 | 384 | C$_{3825}$H$_{7653}$N$_{1531}$O$_{765}$ | 87,340 | 80 |
| 8 | 768 | C$_{7665}$H$_{15333}$N$_{3067}$O$_{1533}$ | 175,005 | 92 |
| 9 | 1536 | C$_{15345}$H$_{30693}$N$_{6139}$O$_{3069}$ | 350,335 | — |
| 10 | 3072 | C30705H61413N12283O6141 | 701,012 | — |

EDA CORE PAMAM DENDRIMER MOLECULAR CHARACTERISTICS

| Generation | Surface Groups | MW | Hydrodynamic Radius, Å SEC | DSV | SANS |
|---|---|---|---|---|---|
| 0 | 4 | 517 | 7.6 | — | — |
| 1 | 8 | 1,430 | 10.8 | 10.1 | — |
| 2 | 16 | 3,256 | 14.3 | 14.4 | — |
| 3 | 32 | 6,909 | 17.8 | 17.5 | 17.8 |
| 4 | 64 | 14,215 | 22.4 | 25.0 | 26.4 |
| 5 | 128 | 28,826 | 27.2 | 32.9 | 33.5 |
| 6 | 256 | 58,048 | 33.7 | — | 43.3 |
| 7 | 512 | 116,493 | 40.5 | — | 50.6 |
| 8 | 1024 | 233,383 | 48.5 | — | — |
| 9 | 2048 | 467,162 | 57.0 | — | 65.1 |
| 10 | 4096 | 934,720 | 67.5 | — | — |

The Hydrodynamic Radius shown immediately above was determined at 25° C., pH of 2.7, using 0.1 molar citric acid in water. Values are reported using Size Exclusion Chromatography (SEC) determined relative to linear polyethylene oxide standards; Dilute Solution Viscometry (DSV), and Small Angle Neutron Scattering (SANS).

The surface activity of the obtained products was determined by the Wilhelmy plate method for water soluble materials, and on a Langmuir trough for water insoluble materials.

Reactions between a PAMAM dendrimer, generation 3, ethylene diamine core with 32 —NH$_2$ groups, and chloromethyltrimethylsilane for example, were generally carried out in dimethyl formamide at elevated temperatures under nitrogen. HCl was neutralized by the addition of sodium carbonate after completion of reaction, or by the addition of sodium bicarbonate with the silane to achieve higher degrees of surface modification, and the product was purified by dialysis in water/methanol, and then in pure methanol. Table 1 below shows the degrees of conversion as determined by $^1$H NMR and the calculated molecular weights. In Table 1, Me represents the methyl group and Vi represents the vinyl group.

TABLE 1

| Dendrimer Number | Silane Used | MW (Calculated) | % Modification of —NH groups |
|---|---|---|---|
| 1 | ClCH$_2$SiMe$_3$ | 7,239 | 6 |
| 2 | ClCH$_2$SiMe$_3$ | 7,955 | 19 |
| 3 | ClCH$_2$SiMe$_3$ | 9,387 | 45 |
| 4 | ClCH$_2$SiMe$_3$ | 11,976 | 91 |
| 5 | ClCH$_2$SiMe$_2$Vi | 12,245 | 85 |

Surface tensions of aqueous solutions of water soluble dendrimers which had been sonicated for at least ten minutes, were measured using a Cahn balance equipped with a platinum Wilhelmy plate. Surface pressure/area determinations of water insoluble dendrimers were made using a KSV Instruments Langmuir trough with chloroform as spreading solvent.

Plots of surface tension of aqueous solutions versus log concentration for the water soluble dendrimers based on chloromethylsilane modification were made, and are summarized below. Plots of surface pressure versus area for the insoluble dendrimers were also made, and are summarized below. Table 2 below shows the apparent surface areas ($A_L$) of the five modified dendrimers. It is evident that there is an order of magnitude difference between the values for the soluble and insoluble species.

TABLE 2

| Dendrimer Number | $A_L$ (Å²/mol) | Solubility |
| --- | --- | --- |
| 1 | 31 | Water Soluble |
| 2 | 87 | Water Soluble |
| 3 | 82 | Water Soluble |
| 4 | 954 | Water Insoluble |
| 5 | 1,057 | Water Insoluble |

The Langmuir trough insoluble dendrimer data was collected by a measurement made by first compressing the film and then expanding it. The surface areas were taken from the extrapolation to zero pressure on the commencement of the expansion phase, after the molecules had been pressured together in the surface. These areas were found to correspond to the expected diameter of fourth generation PAMAM dendrimers.

Areas in the surface of the soluble dendrimers were calculated from the Gibbs adsorption isotherm $A_L = 2.303 \, kT/[\delta\sigma/\delta\log c]$ wherein $A_L$ is the limiting area in the surface, T is the temperature, k is the Boltzmann constant, $\sigma$ is the surface tension, and c is the concentration. This is an approximate form of the equation which in its precise form uses activities rather than concentrations.

The PAMAMOS dendrimers exhibited considerable surface activity. The best of the water-soluble materials lowered the surface tension of water to less than 30 mN/m. Areas in the surface according to the Gibbs adsorption isotherm were surprisingly small, of the order of 100 Å²/mol. More completely hydrophobed dendrimers formed spread monolayers on water, capable of sustaining surface pressures over 40 mN/m. The areas per molecule of both trimethylsilyl and vinyldimethylsilyl treated dendrimer variants were in the expected 1,000 Å²/mol for fourth generation dendrimers.

The following examples are set forth to illustrate our invention in more detail, and to show methods for the preparation of radially layered PAMAMOS dendrimers according to the invention, and their characterization.

EXAMPLE 1

Modification of E3 EDA core PAMAM dendrimer with (3-acryloxypropyl)dimethoxymethylsilane (A)

All glassware used in this example was first dried overnight in a heating oven and then assembled while still hot. A three-necked round bottomed reaction flask was equipped with a nitrogen inlet, a stopper, and a condenser with another stopper at its top, evacuated to a partial vacuum, and flame-dried using several nitrogen-vacuum purging cycles. After the assembled glassware was cooled to room temperature, i.e., 20°–25° C., the apparatus was filled with nitrogen predried by passing it over drierite, and the stopper on the flask was removed under a strong counter-stream of dry-nitrogen and replaced by a rubber septum. A rubber balloon was placed on the top of the condenser in order to allow control of slight overpressures in the assembly. The syringes were also dried overnight in the oven and kept in a desiccator until used. The dendrimer was lyophilized under high vacuum overnight in a round-bottomed flask, then weighed (1.56 g; 0.23 mmol; 14.45 mmol of —NH groups), placed under dry-nitrogen, and the flask was equipped with a rubber-septum. Anhydrous methanol (10 ml) was added via syringe through the septum. When the dendrimer was dissolved, the mixture was transferred with a syringe to the apparatus. (3-acryloxypropyl)dimethoxymethylsilane (A; 4.2 ml; 4.2 g; 17.79 mmol) was added, and the mixture was left at room temperature, with stirring, under nitrogen atmosphere for 24 hours. Methanol was evaporated first under a stream of dry-nitrogen, then under vacuum. The percent modification of the dendrimer was determined by $^1$H Nuclear Magnetic Resonance (NMR): 60% of (A) had reacted, so 74% of the —NH groups had been modified. The modified dendrimer was stable as long as it was kept in an anhydrous solution. Its characterization by $^1$H NMR in deuterated chloroform (CDCl$_3$) follows: 0.02 ppm (s; ≡Si—CH$_3$); 0.52 ppm (m; —CH$_2$—Si≡); 1.61 ppm (m; —COO—CH$_2$—CH$_2$—CH$_2$—Si≡); 2.4–3.6 ppm (PAMAM dendrimer protons); 3.40 ppm (s; ≡Si—P—CH$_3$); 3.94 ppm (t; PAMAM—COO—CH$_2$—); 4.02 ppm (t, CH$_2$=CH—COO—CH$_2$—); 5.68–6.32 ppm (d+dxd+d; CH$_2$=CH—COO—) and $^{13}$C NMR in CDCl$_3$, the modified dendrimer: –6.18 ppm (≡Si—CH$_3$); 8.89 ppm (—CH$_2$—Si≡); 21.82 ppm (—COO—CH$_2$—CH$_2$—CH$_2$—Si≡); 32.37 ppm (=N—CH$_2$—CH$_2$—COO—(CH$_2$)$_3$—Si≡); 33.54 ppm (—CH$_2$—CO—NH—); 34.75 ppm (—NH—CH$_2$—CH$_2$—COO—(CH$_2$)$_3$—Si≡); 37.10 and 37.29 ppm (—CO—NH—CH$_2$—); 38.76 ppm (—CO—NH—CH$_2$—CH$_2$—NH—(CH$_2$)$_2$—COO—); 44.43 ppm (—CO—NH—CH$_2$—CH$_2$—NH—(CH$_2$)$_2$—COO—); 48.37 ppm (—NH—CH$_2$—CH$_2$—COO—(CH$_2$)$_3$—Si≡); 48.92 ppm (—CO—NH—CH$_2$—CH$_2$—N—((CH$_2$)$_2$—COO—)$_2$); 49.54 ppm (—CO—NH—CH$_2$—CH$_2$—N=); 49.89 ppm (≡Si—O—CH$_3$); 51.33 ppm (=N—CH$_2$—CH$_2$—COO—); 52.20 and 52.60 ppm (=N—CH$_2$—CH$_2$—CONH—); 66.31 ppm (=N—(CH$_2$)$_2$—COO—CH$_2$—); 128.32 and 130.18 ppm (CH$_2$=CH—); 172.21 and 172.31 ppm (—CH$_2$—CH$_2$—COO— and —CO—NH—) and the unreacted acrylate reagent: –6.18 ppm (≡Si—CH$_3$); 8.89 ppm (—CH$_2$—Si≡); 21.82 ppm (—COO—CH$_2$—CH$_2$—CH$_2$—Si≡); 49.89 ppm (≡Si—O—CH$_3$); 66.36 ppm (CH$_2$=CH—COO—CH$_2$—); 128.32 and 130.18 ppm (CH$_2$=CH—); 165.92 ppm (CH$_2$=CH—COO—).

EXAMPLE 2

Synthesis of (3-acryloxypropyl)bis (vinyldimethylsiloxy)methylsilane (B)

A three-necked round bottomed flask was equipped with a nitrogen inlet, a vertical condenser and a rubber septum. The nitrogen inlet was arranged so that nitrogen could bubble directly into the reaction mixture. Gas coming out of the condenser was directed into a 1N NaOH solution and then to a bubbler. Under nitrogen atmosphere, (3-acryloxypropyl)dimethoxymethylsilane (2 ml, 2 g, 8.47 mmol) was introduced into the reactor followed by tetrahydrofuran (THF) (25 ml) and chlorodimethylvinylsilane (6.9 ml, 6.13 g, 50.82 mmol). The apparatus was closed with the septum and the mixture was stirred. Water (0.94 ml, 52 mmol) was introduced dropwise through the septum. The reaction was left stirring under bubbling nitrogen for 16.5 hours. The solvent was evaporated and the remaining product was carefully dried. The product was used in Example 3 without further purification. Yield=60.4%. Its characterization by $^1$H NMR in CDCl$_3$ follows: 0.01 ppm (s, —CH$_2$—Si—CH$_3$(—O—Si≡)$_2$); 0.12 ppm (s; —O—Si(CH$_3$)$_2$Vi); 0.48 ppm (m; CH$_2$—CH$_2$—Si≡); 1.64 ppm (m; —CH$_2$—CH$_2$—CH$_2$—); 4.06 ppm (t; —COO—CH$_2$—); 5.64–6.38 ppm (dxd+d; ≡Si—CH=CH$_2$) and $^{13}$C NMR in CDCl$_3$: −0.43 and 0.19 ppm (≡Si—CH$_3$); 13.43 ppm (—CH$_2$—CH$_2$—Si≡); 22.35 ppm (—COO—CH$_2$—CH$_2$—CH$_2$—Si≡); 66.74 ppm (—COO—CH$_2$—); 128.62 and 130.20 ppm (CH$_2$=CH—COO—); 131.73 and 139.08 ppm (CH$_2$=CH—Si≡); 166.12 ppm (—COO—).

EXAMPLE 3

Modification of E3, EDA core, PAMAM dendrimer with (3-acryloxypropyl)bis(vinyldimethylsiloxy) methylsilane (B)

The procedure used in this example was the same as the procedure used in Example 1 for modification of the E3 EDA core PAMAM dendrimer with (3-acryloxypropyl) dimethoxymethylsilane (A), except that in this example the reaction apparatus and the solvent were not pre-dried. The E3, EDA core PAMAM dendrimer was lyophilized under high vacuum as in Example 1 using the dendrimer (0.63 g, 9.12×10$^{-5}$ mol, 5.83 mmol of —NH groups); (3-acryloxypropyl)bis(vinyldimethylsiloxy)methylsilane (B) (1.93 g, 5.12 mmol); and methanol (5 ml). The reaction was carried out at room temperature for 24 hours. The sample was purified by dialysis (MWCO: 3500, Spectra/Por 7) in methanol. After evaporation of methanol, 0.79 g of the sample was recovered. The percent modification of —NH groups found by $^1$H NMR was 51%. The product was characterized by $^1$H NMR in CDCl$_3$ as follows: 0.01 and 0.03 ppm (s, —CH$_2$—Si—CH$_3$(—O—Si≡)$_2$); 0.12 ppm (s; —O—Si—(CH$_3$)$_2$—CH=CH$_2$); 0.45 ppm (m; —CH$_2$—Si≡); 1.60 ppm (m; —COO—CH$_2$—CH$_2$—CH$_2$—Si≡); 2.1–3.6 ppm (PAMAM dendrimer protons); 3.96 ppm (t; PAMAM—COO—CH$_2$—); 5.65–6.14 ppm (d+d+dxd; ≡Si—CH=CH$_2$) and $^{13}$C NMR in CDCl$_3$: −0.37 and 0.29 ppm (≡Si—CH$_3$); 13.43 ppm (—CH$_2$—Si≡); 22.33 ppm (—CH$_2$—CH$_2$—CH$_2$—); 32.56 ppm (=N—CH$_2$—CH$_2$—COO—(CH$_2$)$_3$—Si≡); 33.77 ppm (—CH$_2$—CO—NH—); 37.35 ppm (—CO—NH—CH$_2$—); 49.13 ppm (—CO—NH—CH$_2$—CH$_2$—N—((CH$_2$)$_2$—COO—)$_2$); 49.83 ppm (—CO—NH—CH$_2$—CH$_2$—N=); 51.58 ppm (=N—CH$_2$—CH$_2$—COO); 52.50 ppm and 52.90 ppm (=N—CH$_2$—CH$_2$—CONH—); 66.82 ppm (=N—(CH$_2$)$_2$—COO—CH$_2$—); 128.62 and 130.32 ppm (CH$_2$=CH—COO—); 131.79 and 139.10 ppm (CH$_2$=CH—Si≡); 172.50 ppm (—CO—NH— and —CH$_2$—CH$_2$—COO—).

EXAMPLE 4

Modification of E3, EDA core, PAMAM dendrimer with (3-acryloxypropyl)tris (trimethylsiloxy)silane (C)

The procedure used in this example was the same as the procedure used in Example 3 for modification of the E3 EDA core PAMAM dendrimer with (3-acryloxypropyl)bis (vinyldimethylsiloxy)methylsilane (B). The E3, EDA core PAMAM dendrimer was lyophilized under high vacuum (0.32 g, 0.47×10$^{-4}$ mol, 3 mmol of —NH groups); then mixed with (3-acryloxypropyl)tris(trimethylsiloxy)silane (C) (1.47 g, 3.6 mmol); and dimethyl formamide (DMF) (3 ml). The reaction was carried out at room temperature for 24 hours. Then the sample was purified by dialysis (MWCO: 3500, Spectra/Por 7) in methanol. After evaporation of the methanol, 0.80 g of the sample was recovered. The percent modification of —NH groups found by $^1$H NMR was 45%. Characterization of the product by $^1$H NMR in CDCl$_3$ follows: 0.05 ppm (s, ≡SiCH$_3$); 0.40 ppm (m; —CH$_2$—Si≡); 1.59 ppm (m; —COO—CH$_2$—CH$_2$—CH$_2$—Si≡); 2.1–3.6 ppm (PAMAM dendrimer protons); 3.96 ppm (t; PAMAM—COO—CH$_2$—) and $^{13}$C NMR in CDCl$_3$: 1.68 ppm (≡Si—CH$_3$); 10.33 ppm (—CH$_2$Si≡); 22.66 ppm (—CH$_2$—CH$_2$—CH$_2$—); 32.45 ppm (=N—CH$_2$—CH$_2$—COO—(CH$_2$)$_3$—Si≡); 34.34 ppm (—CH$_2$—CO—NH— and —NH—CH$_2$—CH$_2$—COO—); 37.58 ppm (—CO—NH—CH$_2$—CH$_2$N=); 39.03 ppm (—CONH—CH$_2$—CH$_2$—NH—); 44.63 ppm (—CONH—CH$_2$—CH$_2$—NH—); 48.56 ppm (—CH$_2$—NH—CH$_2$—CH$_2$—COO—); 49.04 ppm (—CO—NH—CH$_2$—CH$_2$—N—((CH$_2$)$_2$—COO—)$_2$); 50.24 ppm (—CO—NH—CH$_2$—CH$_2$—N=); 51.58 ppm (=N—CH$_2$—CH$_2$—COO—); 52.48 ppm (=N—CH$_2$—CH$_2$—CONH—); 66.78 ppm (N—(CH$_2$)$_2$—COO—CH$_2$—); 172.56 ppm and 173.02 ppm (—CO—NH— and CH$_2$—CH$_2$—COO—).

EXAMPLE 5

Modification of E3 EDA core PAMAM dendrimer with chloromethyltrimethylsilane (corresponding to Synthesis of Dendrimers 1–3 shown in Table 3

An E3 EDA core PAMAM dendrimer with 32 —NH$_2$ surface groups was lyophilized in methanol in a round bottomed flask equipped with a magnetic stirring bar and kept under vacuum overnight. The obtained crisp solid was weighed and then dissolved in a solvent (see Table 3). Then, chloromethyltrimethylsilane was added to the solution and a condenser was attached to the flask. The mixture was stirred, heated and kept under nitrogen atmosphere during the entire time of the reaction. Heating was stopped and a sample was taken, dissolved in deuterated methanol (CD$_3$OD), and analyzed by $^1$H NMR to determine the percent of dendrimer modification. Sodium carbonate and methanol were added to the reaction mixture and left to stir overnight. The salts were filtered out, and the filtrate was dialyzed first in a 50:50 methanol/water mixture, then in pure methanol. Methanol was evaporated, and the obtained dendrimer was dried in partial vacuum. Its characterization by $^1$H NMR in CD$_3$OD follows: 0.07 ppm (s, ≡Si—CH$_3$); 2.08–3.35 ppm (PAMAM dendrimer protons). $^{13}$C NMR in CD$_3$OD: −2.23 ppm (≡Si—CH$_3$); 34.82 ppm (—CH$_2$—CO—NH—); 38.68 ppm (—CO—NH—CH$_2$—CH$_2$—N=); 39.33 and 40.53 ppm (—CO—NH—CH$_2$—CH$_2$—NH—CH$_2$—Si≡ and —CO—NH—CH$_2$—CH$_2$—NH—CH$_2$—Si≡); 42.09 ppm (—CO—NH—CH$_2$—CH$_2$—NH$_2$); 42.93 ppm (—CO—NH—CH$_2$—CH$_2$—NH$_2$); 51.18 ppm (—CO—NH—CH$_2$—CH$_2$—N= and =N—CH$_2$—CH$_2$—CONH—(CH$_2$)$_2$—NH$_2$); 53.55 ppm (=N—CH$_2$—CH$_2$—CONH—(CH$_2$)$_2$—N=); 54.19 ppm (—NH—CH$_2$—Si≡); 174.64, 175.00, and 175.10 ppm (—CO—NH—). Characterization by Differential Scanning Calorimetry (DSC) of Dendrimer 3 follows: Tg=17.4° C. (under nitrogen; heating from −70° C. to 130° C. at 5° C./min). Characterization follows of Thermogravimetric Analysis (TGA) of Dendrimer 3; (from room temperature to 1000° C. at 20° C./min): one decomposition process under nitrogen started at 105° C.; maximum at 308° C. (86% of weight loss), and three decomposition processes under air started at 172° C. with respective maxima at 301° C. (57% of weight loss), 408° C. (18% of weight loss), and 541° C. (18% of weight loss).

Dendrimers 4 and 5 of Tables 1 and 2 above were prepared in an analogous way as this example, but with the addition of sodium bicarbonate with the reactants.

The process carried out in Example 5 can be represented schematically as shown below:

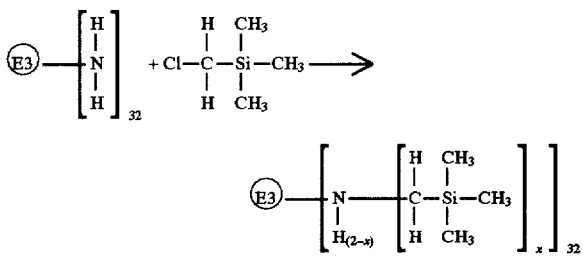

The process carried out in Example 5 is further summarized in Table 3 below:

TABLE 3

Modification of E3 EDA core PAMAM dendrimer with chloromethyltrimethylsilane

| Dendrimer | n-NH mmol | nHalo mmol | nHalo/ n-NH | Solvent | T (°C.) | Time hours | %ᵃ |
|---|---|---|---|---|---|---|---|
| 1 | 13.42 | 6.71 | 0.5 | MeOH 10 ml | 40 | 73 (3 days) | ~6% |
| 2 | 10.80 | 5.40 | 0.5 | DMF 10 ml | 40 | 68.5 (3 days) | 19% |
| 3 | 12.00 | 6.00 | 0.5 | DMF 6 ml | 80 | 161 (7 days) | 44.5% |

ᵃ= Percent modification of —NH groups: Determined from $^1$H NMR of the crude reaction products.

The process is not solvent specific, and any suitable solvent can be used according to our invention, such as methanol (MeOH), dimethyl formamide, tetrahydrofuran, dimethylacetamide, dimethylsulfoxide, N-methyl-2-pyrrolidone, hexamethylphosphoramide, or tetramethylurea.

EXAMPLE 6

Modification of E3 EDA core PAMAM dendrimer with chloromethyltrimethylsilane

Chloromethyltrimethylsilane (2.00 ml; 1.77 g; 14.44 mmol), sodium iodide (2.4 g; 16.0 mmol; [NaI]/[ClR]=1.1), 18-Crown-6 ether represented by the structure

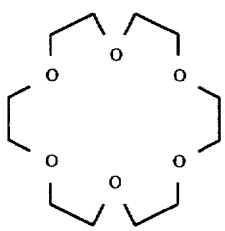

(0.24 g; 0.89 mmol, 6.2%/[-Cl], and DMF (5 ml) were introduced into a round-bottomed flask equipped with a magnetic stirring bar and a condenser. The whole apparatus was kept under nitrogen atmosphere. The reaction mixture was stirred and heated at 60° C. overnight. An E3 EDA core PAMAM dendrimer having 32 —NH$_2$ surface groups was lyophilized in methanol in a round-bottomed flask equipped with a magnetic stirring bar and kept under vacuum overnight. The obtained crispy solid (1.63 g, 0.23 mmol; 15.06 mmol of —NH) was dissolved in 15 ml of DMF. When all of the dendrimer was in solution, it was added to the previous reaction mixture followed by sodium bicarbonate (1.26 g; 15.00 mmol). The reaction mixture was stirred at 80° C. From time to time, samples were taken for $^1$H NMR analysis to follow advancement of the reaction. Stirring and heating were stopped after 92 hours when complete modification of the —NH groups had been achieved. The mixture was filtered and the filtrate was dialyzed, first in a water/methanol mixture, and then in pure methanol (Spectra/Por 7; MWCO 3500). Characterization by $^1$HNMR in CD$_3$OD follows: 0.08 ppm (s, ≡Si—CH$_3$); 2.03–3.33 ppm (PAMAM dendrimer protons). Characterization by $^{13}$C NMR in CD$_3$OD follows: –0.90 ppm (≡SiCH$_3$); 34.81 ppm (—CH$_2$—CO—NH—); 38.05 ppm (—CO—NH—CH$_2$—CH$_2$—N—(CH$_2$—Si(CH$_3$)$_3$)$_2$); 38.62 ppm (—CO—NH—CH$_2$—CH$_2$—N≡); 50.74 ppm (—CO—NH—CH$_2$—CH$_2$—N—(CH$_2$—Si—(CH$_3$)$_3$)$_2$); 51.16 ppm (—CO—NH—CH$_2$—CH$_2$—N≡); 51.56 ppm (≡N—CH$_2$—CH$_2$—CONH—(CH$_2$)$_2$—N—(CH$_2$SiMe$_3$)$_2$); 53.51 ppm (≡N—CH$_2$—CH$_2$—CONH—(CH$_2$)$_2$—N≡); 61.31 ppm (≡N—CH$_2$Si≡); 174.53 and 174.67 ppm (—CO—NH—). Characterization by DSC: Tg=–5.8° C. (under nitrogen; heating from –50° C. to 100° C. at 10° C./min). Characterization by TGA (from room temperature to 1000° C. at 20° C./min): in nitrogen, two decomposition processes started at 42° C.; with the maxima at 254° C. (83% of weight loss), and 384° C. (11% of weight loss) respectively; in air, three decomposition processes started at 105.3° C., and the maxima were at 240° C. (55% of weight loss), 377° C. (9% of weight loss), and 554° C. (32% of weight loss), respectively.

EXAMPLE 7

Modification of E3 EDA core PAMAM dendrimer with chloromethyldimethylvinylsilane The procedure described for Example 5 was repeated in this example. The reactor used was a three-necked, round-bottom flask, equipped with a stopper, mechanical stirrer, and vertical condenser with a nitrogen inlet at its top. Chloromethyldimethylvinylsilane (8.1 ml; 7.22 g; 53.64 mmol), sodium iodide (8.87 g; 59.18 mmol; [NaI]/[ClR]= 1.1), 18-Crown-6 ether (0.72 g; 2.72 mmol, 5.1%/[-Cl]), and DMF (20+30 ml) were used. 100% modification of —NH groups was again obtained. Characterization by $^1$H NMR in CD$_3$OD: 0.14 ppm (s, ≡Si—CH$_3$); 2.11–3.34 ppm (PAMAM dendrimer protons); 5.71–6.26 ppm (≡Si—CH=CH$_2$). Characterization by $^{13}$C NMR in CD$_3$OD: –2.80 ppm (≡Si—CH$_3$); 34.77 ppm (—CH$_2$—CO—NH—); 38.25 ppm (—CO—NH—CH$_2$—CH$_2$—N—(CH$_2$—Si(CH$_3$)$_2$Vi)$_2$); 38.58 ppm (—CO—NH—CH$_2$—CH$_2$—N≡); 50.50 ppm (—CO—NH—CH$_2$—CH$_2$—N—(CH$_2$—Si(CH$_3$)$_2$Vi)$_2$); 51.09 ppm (—CO—NH—CH$_2$—CH$_2$—N≡ and N—CH$_2$—CH$_2$—CONH—(CH$_2$)$_2$—Si≡); 53.48 ppm (≡N—CH$_2$—CH$_2$—CONH—(CH$_2$)$_2$—N≡); 61.14 ppm (≡N—CH$_2$—Si≡); 133.16 and 139.67 ppm (≡Si—CH=CH$_2$); 174.16 and 174.45 ppm (—CO—NH—). Characterization by $^{29}$Si NMR in CD$_3$OD: –8.74 ppm (≡N—CH$_2$—Si(CH$_3$)$_2$Vi). Characterization by DSC: Tg=–2.5° C. (under nitrogen; heating from –50° C. to 100° C. at 10° C./min).

Other variations may be made in compounds, compositions, and methods described herein without departing from the essential features of our invention. The forms of invention are exemplary only and not intended as limitations on their scope as defined in the appended claims.

We claim:

1. A composition comprising a radially layered copolymeric dendrimer having a hydrophilic poly(amidoamine) or poly(propyleneimine) interior and a hydrophobic organosilicon exterior, the copolymeric dendrimer being prepared by reacting a hydrophilic dendrimer having —$NH_2$ surface groups, with an organosilicon compound, in the presence of a solvent.

2. A composition according to claim 1 in which the organosilicon compound has a formula selected from the group consisting of $XSiR_nY_{(3-n)}$ and $XR''_pY_{2-p}Si(OSiR''_2)_mOSiR''_nY_{3-n}$ wherein m is zero to 100; n is zero, one, two, or three; p is zero, one, or two; X is a group that reacts with —$NH_2$; R, R', and R", are an alkyl radical containing 1–6 carbon atoms, an aryl radical, or a fluoroalkyl radical; and Y is a group that does not react with —$NH_2$.

3. A composition according to claim 2 in which X is $CH_2$=$CHCOO(CH_2)_3$—, $ClCH_2$—, $BrCH_2$—, $ICH_2$—, epoxy, $ClCO(CH_2)_a$—, $R'''OCO(CH_2)_a$—, $NCO$—$R''''$—, or $NCOCH_2CH$=$CH$—, wherein a is 1–6; R''' and R'''' are alkyl radicals containing 1–6 carbon atoms, aryl radicals, or fluoroalkyl radicals; and Y is a vinyl radical, an allyl radical, —OR, hydrogen, a triorganosiloxy radical, or a ferrocenyl radical.

4. A composition according to claim 3 in which the organosilicon compound is (3-acryloxypropyl) methyldimethoxysilane, (3-acryloxypropyl)bis (vinyldimethylsiloxy)methylsilane, (3-acryloxypropyl)tris (trimethylsiloxy)silane, chloromethyltrimethylsilane, iodomethyltrimethylsilane, or chloromethyldimethylvinylsilane.

5. A composition according to claim 1 in which the hydrophilic dendrimer is a generation 0 to generation 10 poly(amidoamine) dendrimer, or a generation 0 to generation 5 poly(propyleneimine) dendrimer.

6. A composition according to claim 5 in which the hydrophilic dendrimer has from about 3 to about 4100 surface groups.

7. A composition according to claim 6 in which the molecular weight of the hydrophilic dendrimer is from about 350 to about 935,000.

8. A composition according to claim 7 in which the molecular diameter of the hydrophilic dendrimer ranges from about 10 to about 150 Å.

9. A composition according to claim 8 in which the hydrophilic dendrimer is a generation 3 poly(amidoamine) dendrimer having 32 surface groups.

10. A composition according to claim 1 where the copolymeric dendrimer is prepared in a solvent selected from the group consisting of methanol, dimethyl formamide, tetrahydrofuran, dimethylacetamide, dimethylsulfoxide, N-methyl-2-pyrrolidone, hexamethylphosphoramide, and tetramethylurea.

11. A composition according to claim 5 wherein the copolymeric dendrimer has from 1 to 4100 exterior organosilicon groups.

12. A method of lowering the surface tension of an aqueous solution comprising adding to the solution an effective amount of the copolymeric dendrimer according to claim 1.

13. A method of forming spread monolayers on water capable of sustaining surface pressures above 40 mN/m comprising applying to an aqueous surface an effective amount of the copolymeric dendrimer according to claim 1.

* * * * *